United States Patent
Freiwald et al.

(10) Patent No.: US 10,576,990 B2
(45) Date of Patent: Mar. 3, 2020

(54) METHOD AND DEVICE FOR HANDLING SAFETY CRITICAL ERRORS

(71) Applicant: Infineon Technologies AG, Neubiberg (DE)

(72) Inventors: Axel Freiwald, Munich (DE); Bejoy Mathews, Oberhaching (DE); Antonio Vilela, Mering (DE)

(73) Assignee: Infineon Technologies AG, Neubiberg (DE)

( * ) Notice: Subject to any disclaimer, the term of this patent is extended or adjusted under 35 U.S.C. 154(b) by 113 days.

(21) Appl. No.: 15/848,626

(22) Filed: Dec. 20, 2017

(65) Prior Publication Data

US 2018/0111626 A1 Apr. 26, 2018

Related U.S. Application Data

(62) Division of application No. 15/041,789, filed on Feb. 11, 2016, now Pat. No. 10,017,188.

(30) Foreign Application Priority Data

Mar. 12, 2015 (DE) .................... 10 2015 003 194

(51) Int. Cl.
*B60W 50/029* (2012.01)
*G05B 9/03* (2006.01)
*B60W 50/023* (2012.01)
*B60W 50/00* (2006.01)

(52) U.S. Cl.
CPC ........ *B60W 50/029* (2013.01); *B60W 50/023* (2013.01); *G05B 9/03* (2013.01); *B60W 2050/0018* (2013.01); *B60W 2050/0292* (2013.01); *G05B 2219/24188* (2013.01); *G05B 2219/24191* (2013.01)

(58) Field of Classification Search
CPC ............ B60W 50/029; B60W 50/023; B60W 2050/0018; B60W 2050/0292; B60W 50/06; G05B 9/03; G05B 2219/24191; G05B 2219/24188; B60R 16/023
USPC .......................................................... 701/36
See application file for complete search history.

(56) References Cited

U.S. PATENT DOCUMENTS

| | | | |
|---|---|---|---|
| 2013/0024721 A1 | 1/2013 | Kabulepa et al. | |
| 2013/0067259 A1 | 3/2013 | Freiwald et al. | |
| 2013/0231767 A1* | 9/2013 | Sabapathy | G06F 11/0721 |
| | | | 700/95 |
| 2014/0071566 A1 | 3/2014 | Parthasarathy et al. | |

FOREIGN PATENT DOCUMENTS

| | | |
|---|---|---|
| DE | 19834868 A1 | 2/2000 |
| DE | 102005037246 A1 | 2/2007 |
| DE | 102010013349 A1 | 10/2011 |
| JP | S61-023203 A | 1/1986 |
| JP | H05-044546 A | 2/1993 |

(Continued)

*Primary Examiner* — Brian P Sweeney
(74) *Attorney, Agent, or Firm* — Schiff Hardin LLP

(57) ABSTRACT

A device for operating an apparatus comprising a first controller configured to be controlled by a first control signal, a second controller configured to be controlled by a second control signal, a control unit operatively connected to the first controller and the second controller, wherein the first controller and the second controller are both configured to operate the apparatus.

20 Claims, 5 Drawing Sheets

(56) References Cited

FOREIGN PATENT DOCUMENTS

| JP | H07-043257 | A | | 2/1995 |
|----|------------|---|---|--------|
| JP | H7-253897 | A | | 10/1995 |
| JP | 2001-287606 | A | | 10/2001 |
| JP | 2011-046337 | A | * | 3/2011 |
| JP | 2011-046337 | A | | 3/2011 |
| WO | WO-2006/024957 | A2 | | 3/2006 |

* cited by examiner

METHOD AND DEVICE FOR HANDLING SAFETY CRITICAL ERRORS

FIELD OF THE INVENTION

Embodiments of the present invention relate to automotive applications, in particular to safety applications, e.g. for transmission control, alarm display control, electronic power steering or electronic brake control.

BACKGROUND OF THE INVENTION

Electronic functions in automotive applications are often simply turned off in case of detected problems. In electronic control units (ECUs) the microcontroller is turned into a safe passive state if a safety critical fault has occurred. This is known as fail-safe state. Some safety critical faults are non-permanent, but request a shutdown of the whole car electronic network and a new ignition cycle to restart the system.

Another approach is to perform the restart of the electronic function while the car is in operation. Such systems execute a reset followed by a self-test and then try to restart operation. This procedure typically takes several hundred milliseconds in best case and in worst-case the operation does not resume. Thus even in best case the time until the operation resumes might be too long for many applications, e.g. for power steering.

There are realizations of microcontrollers used in automotive applications that are immediately turned into a safe passive state on the occurrence of any safety relevant issue. Due to high software complexity, many of these issues are caused by software bugs which are detected by watchdogs or other protection mechanisms. Other root causes are hardware related, but only a minority of them is triggered by a permanent damage called latent fault.

The acceptance of such error handling has recently changed, i.e. it is no longer accepted that the whole ECU is turned into a save, passive, off state. For safety critical ECUs a backup system is now requested, which shall provide some kind of operation until e.g. the car can get parked safely or until the normal operation can get resumed. Typical names for such operations are called limp home, or limp aside, or backup operation.

A fail-operational system solution or system with enhanced availability provides an acceptable level of performance for safety critical functions even in case of the occurrence of a fault. Reasons for switching to this operation mode could be a latent hardware fault, a sporadic non latent hardware fault or a software fault.

One approach is to use one single controller but to duplicate the most critical parts, which are those parts that have the highest Failure-In-Time (FIT) rates. Another approach is to use a multicore controller including at least one second CPU core and a separate set of peripherals. The second CPU core and peripheral set take over the operation once the first CPU core of the multicore controller detects an issue.

The most expensive solution would be to duplicate or triple the whole electronic control system using two or three ECUs, multiple power supplies and communication systems. Such approaches are too expensive and too space consuming for automotive applications.

Another problem is that most of these solutions are still fighting against errors that are caused by a common source. Especially, if multiple controllers are using the same tools and software, they are potentially having the same systematic problems caused by software bugs.

In addition, such systems contain more components which can fail and the probability that such failures further reduce the reliability or lead to unacceptable high number of situations with reduced operation. As one effect such cars may be forced to go to a service garage too often.

The US 2013/0067259 A1 describes a microcontroller unit which comprises a main-controller and a standby-controller. However, the standby-controller is optimized for low power consumption while the main controller is optimized for high performance.

SUMMARY

A first embodiment relates to a device for operating an apparatus comprising a first controller configured to be controlled by a first control signal, a second controller configured to be controlled by a second control signal, a control unit operatively connected to the first controller and the second controller, wherein the first controller and the second controller are both configured to operate the apparatus.

A second embodiment relates a method for operating an apparatus of a vehicle. The method comprises the following steps: generating a control signal by a first controller operating the apparatus of a vehicle in a first operation mode, evaluating the control signal by a control unit to provide an evaluation result, and taking over operating of the apparatus by a second controller according to the evaluation result.

A third embodiment relates to a system comprising a first controller to operate an apparatus of a vehicle, whereas the apparatus is configured to implement a safety function, a second controller to operate the apparatus and a control unit configured to control the first controller and the second controller, whereas the first controller is implemented on a first die and the second controller is implemented on a second die.

A fourth embodiment relates to a system comprising a first controller to operate an apparatus of a vehicle, whereas the apparatus is configured to implement a safety function, a second controller to operate the apparatus, and a control unit to control the first controller and the second controller, whereas the first controller and the second controller are implemented on one die.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. In the drawings the same reference characters denote similar features.

DETAILED DESCRIPTION OF THE PREFERRED EMBODIMENTS

Embodiments are directed to devices and methods for error handling in automotive safety applications. These may be accomplished by using at least two controllers whereas one controller is a main controller and the other is operating as a backup controller.

In case of an error that occurs in the main controller, the backup controller is able to take over the safety relevant function utilizing its diverse architecture or diverse implementation. By utilizing diversity, the backup controller does not encounter the same problem than the main controller.

Figure 1:
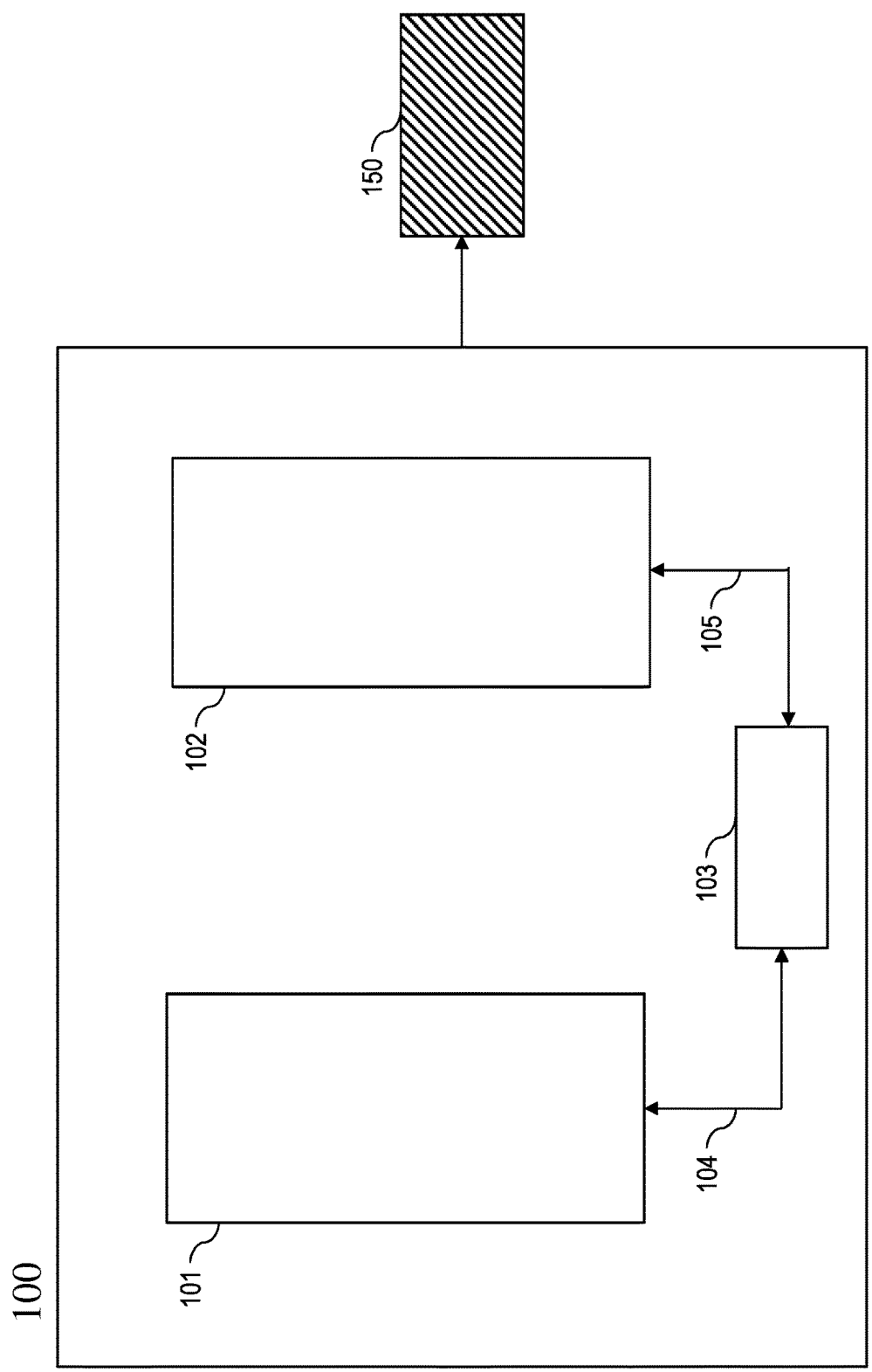
FIG. 1 is a schematic diagram showing a device in accordance with an exemplary embodiment.

FIG. 1 illustrates a device 100 that consists of a main controller 101, a backup controller 102 and a control unit 103 connected to the main controller 101 and to the backup controller 102. The device 100 is able to control an apparatus 150, which is a safety critical system of a vehicle. The safety critical system may for instance be an electronic power steering system, a transmission control unit, an electric braking system, or another element performing automotive functions in a car.

The main controller 101 may be a microprocessor or microcontroller which may comprise a CPU core, a memory and a first set of peripherals. The CPU core may be implemented as 8-bit, 16-bit, 32 or 64-bit CPU core and the first set of peripherals may comprise hardware units like interface modules, timers, analog-to-digital converters or port modules. The main controller 101 is supplied by a not shown power supply and executes software instructions at a certain clock frequency derived form a first clock source.

The backup controller 102 may be a state machine, a programmable state machine, a microprocessor or a microcontroller. The backup controller 102 may comprise a further CPU core, further memory and further hardware modules like a second set of peripherals. However, the backup controller 102 may have a simpler architecture compared to the main controller 101.

The device 100 is able to perform or operate in two different operation modes. During normal operation mode the main controller 101 is executing a certain application or functionality to control apparatus 150. In a safety critical error event, device 100 switches from normal operation mode to emergency operation mode. In emergency operation mode backup controller 102 is executing the application or functionality to control apparatus 150.

One example of the behavior of device 100 is that during software execution by the main controller 101 to control the DC motor of an electronic steering system, an error occurs. In this case the backup controller (backup controller) can take over and implement the required functionality in emergency operation mode. By way of example the backup controller could simply keep the system running as it was before the problem occurred.

While the backup controller is operating the steering system, the main controller is rebooted. After the main controller has completed the reboot, it is taking back the control of the steering system, while the backup controller can be set to non-active state.

Hence the operation of the electronic steering system is handled by the main controller or the backup controller.

The control unit 103 may be a safety management unit (SMU). The control unit 103 operates as a kind of supervisor between main controller 101 and backup controller 102. The control unit 103 is connected to the main controller via control signal 104 and to the backup controller via control signal 105. The control signals (104, 105) may be unidirectional or bi-directional and may consist of a plurality of signal lines.

The control unit 103 evaluates the first control signal 104, which may consist of an alarm signal. As a consequence the control unit may set a signal line of the second control signal 105 to activate the backup controller 102, which takes over the function from the main controller in emergency mode.

As soon as the main or main controller recognizes an error in the safety critical function, it may generate an alarm signal. This alarm signal may be evaluated by the control unit 103 to reboot or reset the main controller and to activate the backup controller. The type of alarm signal or other statistics corresponding to this alarm signal may be stored in the control unit 103 or in another memory.

As soon as the main controller is ready to resume the function, the control unit may set a corresponding signal line of the first control signal 104. After the main controller runs in normal mode, the control unit may generate an appropriate control signal 105 to the backup controller 102.

The apparatus 150 may be realized in hardware (HW), i.e. in fix-wired electronic circuitry, or in software (SW) which runs on a CPU implementing a certain safety function. The safety function may for example be a transmission control, alarm display control, electronic power steering or electronic brake control.

Control unit 103 may be able to identify the safety critical error condition, store this event and all related status information for example in a specific memory and initiate processing of backup controller 102.

The two operation modes of device 100 implement the same safety critical function, e.g. electronic steering, in different hardware (HW) or software (SW) structures or different combinations of HW/SW structures.

In one example of this embodiment the CPU core of the backup controller 102 is implemented as 8-bit CPU core while the CPU core of the main controller 101 is implemented as a 32-bit CPU core. In this case the backup controller uses less electronic components The CPU core of the backup controller 102 may run at a clock frequency which is the same or different compared to the clock frequency of the CPU core of main controller 101. In case the backup controller runs at a lower clock frequency, it might consume less power.

The second operation mode, the emergency mode, may for example be implemented by simpler software running on the backup controller compared to a more complex software implementation running on the main controller in the first operation mode, the normal mode.

As an example of this embodiment the main controller 101 executes complex software routines to control an apparatus 150 e.g. comprising an electric motor as part of an electronic power steering application used by a car. The software may provide comfort steering function and may originally be written in C and compiled by a first C-compiler. For this safety function there may exist a backup emergency second software implementation. In one example the second software implementation has used a second C-compiler to get a diverse software implementation.

In a further example the second software implementation consists of different instructions and is less complex but ensures a basic control of the power steering until the overall system can safely be reset, e.g. until the car has stopped and main controller 101 can be reset. The second software implementation runs on the CPU of backup controller 102 if main controller 101 indicates an error during its operation.

In a further example of this embodiment, the peripherals of the backup controller 102 have been implemented by using diversified design tools. These design tools compile source code of a hardware description language, e.g. VHDL or Verilog, into a gate level net list that can be implemented on a silicon die. The implementation of the gate level net list of backup controller 102 has been done using designs tools which are different compared to the design tools used to implement the gate level net list for the main controller 101. Backup controller 102 has been verified by certain verification tools like simulators, debuggers or formal verification tools. The tools used for the architecture of backup controller 102 may have been different compared to the tools used to verify the architecture of the main controller 101.

The use of different design tools, verification tools and different software implementations may provide an architecture and/or implementation of backup controller 102 which is different to the architecture and/or implementations of main controller 101. A diverse architecture and/or diverse implementation reduces the risk of common cause failures. The probability that a root cause of an error during the operation of a safety critical function executed on main controller 101 would also disturb the function executed on backup controller 102 is reduced.

The main and the backup controller differ in respect to their architecture. Furthermore, the different architectures may have been designed using different synthesis tools and verified using different verification and debugging.

Figure 2:
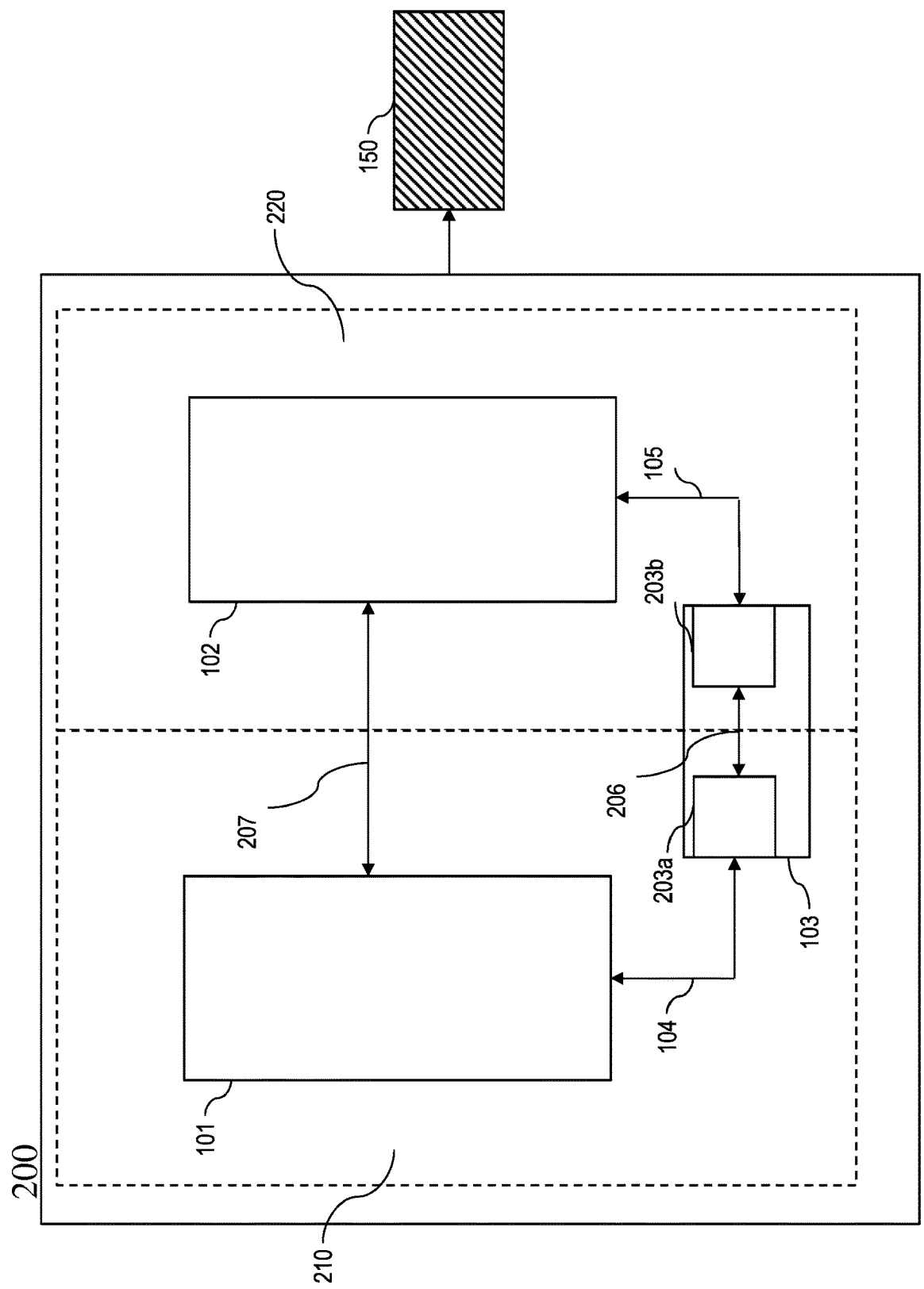
FIG. 2 is another schematic diagram of an exemplary device in accordance with an exemplary embodiment using two power domains.

FIG. 2 shows an apparatus 150 and a device 200 to control apparatus 150. The device 200 comprises two separated domains, domain 210 and domain 220. These domains 210 and 220 may be integrated on one silicon die or on separated silicon dies. The domains 210 and 220 are characterized by dedicated power domains or clock domains meaning that the components which belong to one of the two domains operate in domain specific parameter ranges.

In one example of this embodiment, domain 210 is a power domain characterized by a power supply that provides 3.3 V to components that belong to this domain 210, while domain 220 is a power domain characterized by a power supply that provides 5 V to its components. The components may comprise embedded voltage regulators (EVRs) that provide specific voltages to a group of components or peripherals.

In a further example of this embodiment, domain 210 is characterized by a certain clock source and/or a certain clock frequency. In this case all synchronous modules that belong to domain 210 operate on a clock derived from the domain specific clock source. Domain 220 may have a separated clock source running on the same or a different frequency.

In one embodiment the control unit may be a safety management unit (SMU). The SMU may be implemented such that a first part is implemented in a first power domain and a second part is implemented in a second power domain. The first domain 210 comprises the main controller 101 and a device 203a which is a first part of the SMU 103. The main controller 101 comprises the first CPU and is able to generate an alarm signal as part of the control signal 104 which is input to device 203a. The device 203a, which is a first part of the SMU, reads the control signal 104, evaluates the alarm signal and provides a reset signal as part of control signal 104 to main controller 101. It is noted that other kind of control signals, e.g. a reboot signal, could also be provided to the main controller.

The second domain 220 comprises the backup controller 102 and a device 203b which is a second part of the SMU 103. As described for the first of domain 210, second domain 220 may be characterized by a separated power domain or clock domain.

Main controller 101 and or backup controller 102 are able to generate alarm or status signals as part of control signals 104 or 105 respectively. These alarm or data signals can be evaluated by the control unit 103 or its domain specific circuits 203a and 203b. As a consequence of this evaluation the control unit 103 may generate reset signals as part of the control signals 104 or 105 to the respective controller.

The domain specific circuits 203a and 203b as a part of the control unit 103 communicate over an interface 206. This interface 206 is used to transfer alarm signals, status signals or general information from domain 210 to domain 220. One example for a safety critical application of apparatus 150 may be electronic power steering where the relevant functionality may be executed in device 101 (the main-controller) during normal operation mode. In the case of an error which may be communicated to the control unit 103 by an alarm signal 204, device 102 (the backup controller) is taking over the control of apparatus 150 in emergency operation mode.

To perform the emergency operation mode the backup controller 102 requires necessary information like the current torque or steering angle of the steering system. This information has to be communicated from the main controller 101 to the backup controller 102 via the interface 207.

The diversity between the main controller and the backup controller avoids systematic errors or common cause errors, particularly software errors. The main controller and the backup controller may have dedicated clock sources, i.e. they run on the same, similar or different clock frequencies.

In one embodiment the backup controller should still operate although the main controller lost its power supply. Therefore the main controller and the backup controller should have dedicated power supplies and/or power domains.

Figure 3:
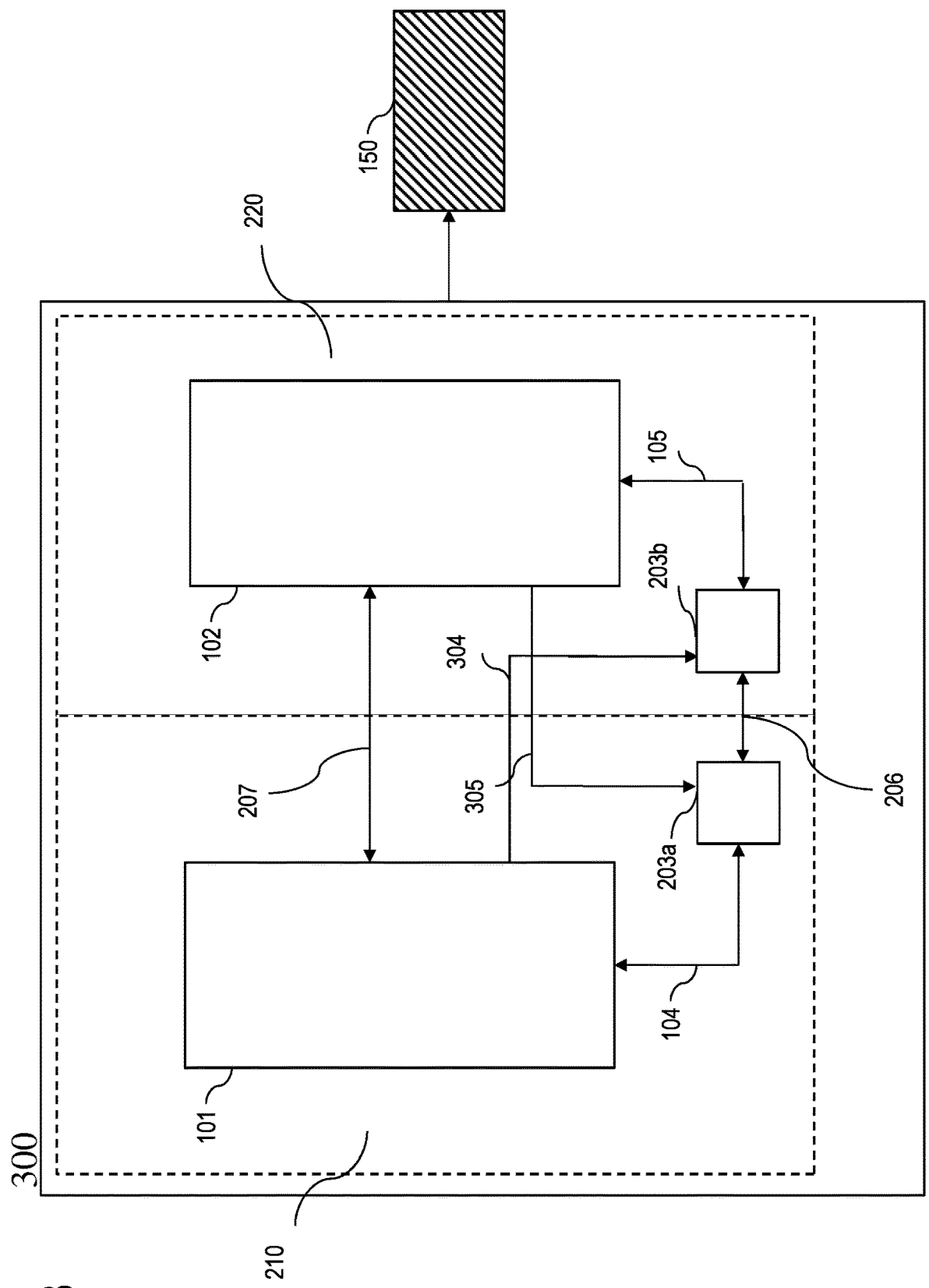
FIG. 3 shows an exemplary device utilizing a plurality of separate control units.

FIG. 3 shows as another embodiment a device 300 which is similar to the device 200. However, contrary to FIG. 2 the main controller 101 generates an alarm or status signal 304, which may comprise of multiple signal lines, and the generated alarm or status signal 304 is read by domain specific sub circuit 203b, i.e. the alarm or status signal 304b crosses domain boundaries. The backup controller 102 generates an alarm or status signal 305, which may comprise of multiple signal lines, and the signal 305 may be input to domain specific sub circuit 203a.

In another not shown embodiment the domain specific circuit 203b generates a control signal which is fed to main controller 101. Vice versa the domain specific circuit 203a of domain 210 generates a control signal that is fed to backup controller 102.

Figure 4:
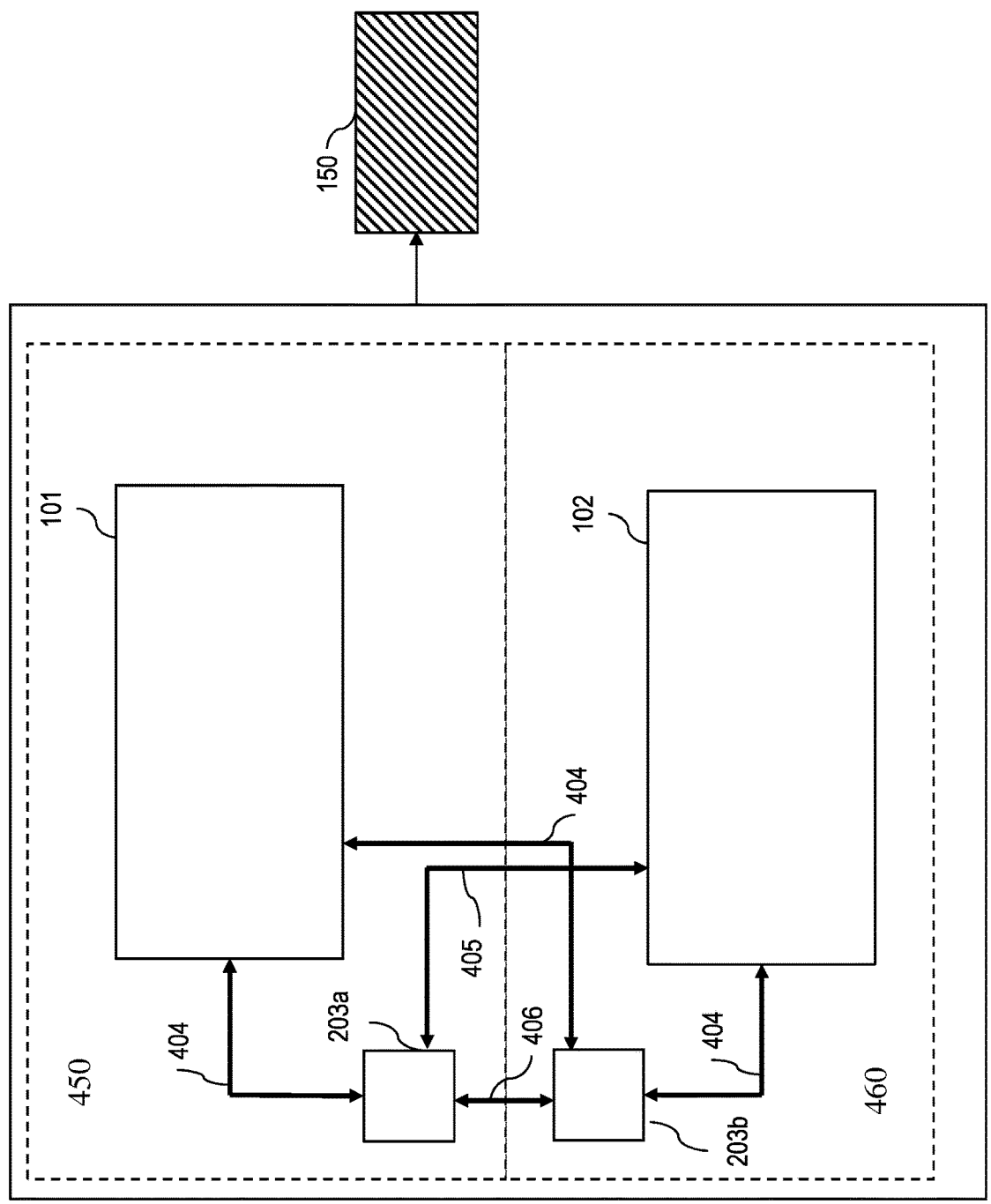
FIG. 4 shows an exemplary device comprising to different dies.

FIG. 4 shows a device 400 comprising a first die 450 and a second die 460. These two silicon dies are for example be implemented in one common semiconductor package. The main controller 101, the domain specific part of the system management unit (SMU) 203a, the interface 404 between the main controller 101 and the SMU part 203a are implemented on first silicon die 450.

The backup controller 102, the domain specific part of the SMU 203b and interface 404 between the backup controller 102 and the part of the SMU 203b are implemented on a second silicon die 460. The cross domain boundary interface signals 404, 405 and 406 may be implemented by dedicated wires between the dies or by flip-chip technology. Flip-chip is a method for interconnecting semiconductor devices, with solder bumps that have been deposited onto the chip pads.

Figure 5:
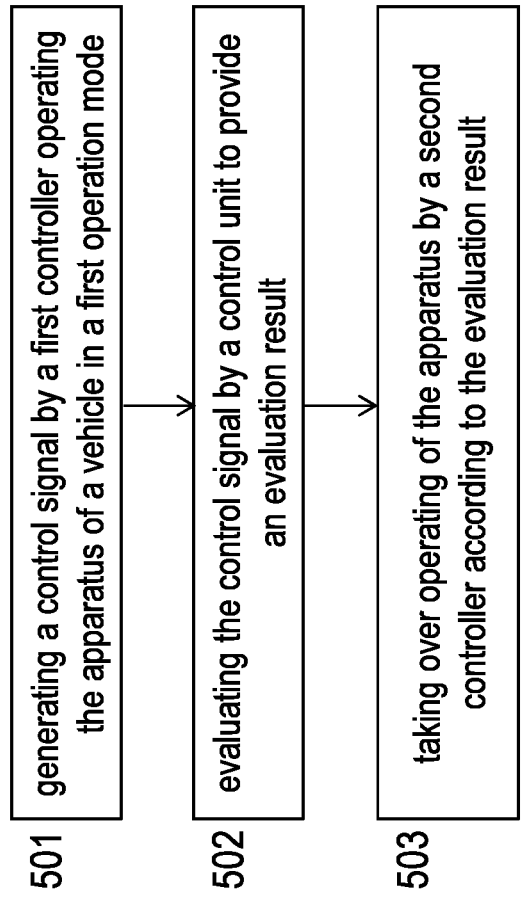
FIG. 5 is a flowchart of a method in accordance with an exemplary embodiment.

FIG. 5 shows a flowchart comprising three steps to implement the disclosed method to operate an apparatus of a vehicle. In step from 501 a control signal is being generated by a main controller, which operates in a first operation mode. This operation mode may in one example be characterized by a safety critical functionality.

Vehicles may be any mobile machines that transport people or cargo such as wagons, bicycles, Motor vehicles (motorcycles, cars, trucks, buses, trains), watercraft (ships, boats), spacecraft and aircraft.

The control signal is for example caused by a failure that is recognized during the execution of a safety critical automotive application. The control signal can be an alarm signal, which may comprise multiple signal lines, which are read and evaluated in Step 502, e.g. by a safety management unit (SMU).

Afterwards, the performance of the first function is taken over by a backup controller in step 503, for example a backup controller. The backup controller may have a different architecture compared to the main controller or a different software implementation or otherwise diversified from the implementation of the main controller.

The examples suggested herein may in particular be based on at least one of the following solutions. In particular combinations of the following features could be utilized in order to reach a desired result. The features of the method could be combined with any feature(s) of the device, apparatus or system or vice versa.

A device for operating an apparatus of a vehicle is provided. The device comprising a first controller configured to be controlled by a first control signal and a second controller configured to be controlled by a second control signal. Furthermore, the device comprises a control unit operatively connected to the first controller and the second controller, wherein the first controller and the second controller are both configured to operate the apparatus.

In case of problems with the first controller operating the apparatus, which may be a safety relevant part of a vehicle, e.g. the electrical brake, the second controller is taking over operating the apparatus, while the first controller is rebooted.

In an embodiment, the first controller is configured to operate the apparatus in a first operation mode and the second controller is configured to operate the apparatus in a second operation mode.

The first operation may be characterized by the normal operation of a vehicle, i.e. the typical driving of a car. The second operation mode may be an emergency mode that ensures a basic and safe further function of the vehicle, maybe with less features or comfort.

In an embodiment, the first operation mode implements a safety function in a first HW/SW structure and the second operation mode implements the safety function in a second HW/SW structure.

The hardware (HW) used by the two controller can be different. They may use a different CPU, a different set of peripherals and/or memories. Also, in addition to a different hardware or as a single difference, the software (SW) running on the two controllers may be different.

In an embodiment, the device further comprises a first clock source to clock the first controller and a second clock source to clock the second controller.

With different clock signals, a different power consumption and performance can be reached. In one example the first or main controller runs on a higher clock rate with higher overall performance compared to the second or backup controller.

In an embodiment, the first controller is configured to run at a first clock frequency and the second controller is configured to run at a second clock frequency.

In an embodiment, the first controller is configured to operate in a first power domain and the second controller is configured to operate in a second power domain.

In an embodiment, the control unit comprises a sub circuit implemented in the first power domain and a second sub circuit implemented in the second power domain.

In an embodiment, the first controller is configured to operate with a first set of peripherals and wherein the second controller is configured to operate with a second set of peripherals.

In an embodiment, the number of peripherals in the second set off peripherals is less than the number of peripherals in the first set of peripherals.

In an embodiment, the control unit is configured to store the first control signal.

A method for operating an apparatus of a vehicle is provided. The method comprises generating a control signal by a first controller and operating the apparatus in a first operation mode. The method continues with evaluating the control signal by a control unit to provide an evaluation result, and taking over the operation of the apparatus by a second controller according to the evaluation result.

In the first mode the first controller, i.e. the main controller, is able to generate an alarm signal which indicates a problem in further operating the apparatus The apparatus may be a safety critical part of a car like the electrical brake or steering system. The generated alarm signal may be evaluated by a safety control unit that decides whether or not the apparatus should better be operated and controlled by the second controller, i.e. by the backup controller.

In an embodiment, the apparatus used in the method is configured to implement a safety function.

In an embodiment, the second controller is implemented in a diverse architecture with respect to the first controller.

In an embodiment, the first controller and the second controller are configured to operate in separate power domains A system is provided. The system comprises a first controller to operate an apparatus of a vehicle, whereas the apparatus is configured to implement a safety function. Additionally, the system comprises a second controller to operate the apparatus and a control unit configured to control the first controller and the second controller, whereas the first controller is implemented on a first die and the second controller is implemented on a second die.

The first die may be manufactured in a certain CMOS semiconductor technology, while the second die may be manufactured in a technology different to the used CMOS technology of the first die. The two dies may provide pads to interface with them. The pads of the two dies may be connected to each other by using a wire-bond technology or flip-chip technology.

In an embodiment, the first die and the second die are implemented in a common package.

The package may be an MQFP, TQFP or a package for BGAs (Ball Grid Arrays). The different parts of the system may either be implemented together with one of the two controllers. In another example the control unit may be implemented on a third die, whereas the third die may be manufactured in the same or a different technology compared to the first and second die.

A further system is provided. The system comprises a first controller to operate an apparatus of a vehicle, whereas the apparatus is configured to implement a safety function and a second controller to operate the apparatus. Additionally, the system comprises a control unit to control the first controller and the second controller, whereas the first controller and the second controller are implemented on one die.

In one or more examples, the automotive safety functions described herein may be implemented at least partially in hardware, such as specific hardware components or a processor. More generally, the techniques may be implemented in hardware, processors, software, firmware, or any combination thereof.

If implemented in software, the safety functions may be stored on or transmitted over one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

Data storage media may be any available media that can be accessed by one or more computers or one or more processors to retrieve instructions, code and/or data structures for implementation of the techniques described in this disclosure. A computer program product may include a computer-readable medium.

Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for operating an apparatus of a vehicle comprising:
generating a control signal by a first controller operating the apparatus in a first operation mode;
evaluating the control signal by a main controller to provide an evaluation result; and
taking over operating of the apparatus by a second controller according to the evaluation result,
wherein the second controller is implemented in a diverse architecture with respect to the first controller.

2. A method according to claim 1, wherein the apparatus is configured to implement a safety function.

3. A method according to claim 1, wherein the first controller and the second controller are configured to operate in separate power domains.

4. A method according to claim 1, wherein the first controller is configured to operate with a first set of hardware elements, the second controller is configured to operate with a second set of hardware elements that is different from the first set of hardware elements, and the number of hardware elements in the second set of hardware elements is less than the number of hardware elements in the first set of hardware elements.

5. A method according to claim 1, wherein the first controller is configured to run at a first clock frequency and the second controller is configured to run at a second clock frequency that is different from the first clock frequency.

6. A method according to claim 1, further comprising:
after taking over operating of the apparatus by the second controller, providing a reboot signal by the main controller to the first controller.

7. The method of claim 6, further comprising:
after the first controller reboots, taking over operation of the apparatus by the first controller.

8. A method according to claim 1, wherein the first controller is associated with a first clock domain corresponding to a first dedicated clock source, and
wherein the second controller is associated with a second clock domain corresponding to a second dedicated clock source.

9. A system comprising:
a first controller to operate an apparatus of a vehicle, wherein the apparatus is configured to implement a safety function;
a second controller to operate the apparatus; and
a main controller configured to control the first controller and the second controller,
wherein the first controller is implemented on a first die and the second controller is implemented on a second die.

10. A system according to claim 9, wherein the first die and the second die are implemented in a common package.

11. A system according to claim 9, wherein the second controller is implemented in a diverse architecture with respect to the first controller.

12. A system according to claim 9, wherein the first controller is configured to operate with a first set of hardware elements, the second controller is configured to operate with a second set of hardware elements that is different from the first set of hardware elements, and the number of hardware elements in the second set of hardware elements is less than the number of hardware elements in the first set of hardware elements.

13. A system according to claim 9, further comprising:
a first clock source configured to clock the first controller and a second clock source configured to clock the second controller.

14. A system according to claim 9, wherein the first controller is implemented with a first software, the second controller is implemented with a second software, and the second software comprises different instructions and is less complex than the first software.

15. A system according to claim 9, wherein the main controller comprises:
a first circuit implemented on the first die and configured to control the first controller; and
a second circuit implemented on the second die and configured to control the second controller.

16. A system comprising:
a first controller to operate an apparatus of a vehicle, wherein the apparatus is configured to implement a safety function;
a second controller to operate the apparatus; and
a main controller to control the first controller and the second controller,
wherein the first controller and the second controller are implemented on one die, and wherein the second controller is implemented in a diverse architecture with respect to the first controller.

17. A system according to claim 16, wherein the first controller is configured to operate with a first set of hardware elements, the second controller is configured to operate with a second set of hardware elements that is different from the first set of hardware elements, and the number of hardware elements in the second set of hardware elements is less than the number of hardware elements in the first set of hardware elements.

18. A system according to claim 16, further comprising:
a first clock source configured to clock the first controller and a second clock source configured to clock the second controller.

19. A system according to claim 16, wherein the first controller is implemented with a first software, the second controller is implemented with a second software, and the second software comprises different instructions and is less complex than the first software.

20. A system according to claim 16, wherein the first controller is associated with a first clock domain corresponding to a first dedicated clock source, and
wherein the second controller is associated with a second clock domain corresponding to a second dedicated clock source.

* * * * *